United States Patent [19]
Feroy

[11] 3,880,181
[45] Apr. 29, 1975

[54] HYDRAULIC CONTROL SYSTEM
[76] Inventor: Finn Feroy, 3214 Ninth St., N.E., Puyallup, Wash. 98371
[22] Filed: May 3, 1973
[21] Appl. No.: 356,891

[52] U.S. Cl. .................... 137/106; 91/445; 91/447; 137/596.14; 137/625.63
[51] Int. Cl. ...................... F15b 13/42; F15b 15/00
[58] Field of Search . 91/445, 447; 137/106, 596.14, 137/625.63

[56] References Cited
UNITED STATES PATENTS

| | | | |
|---|---|---|---|
| 2,809,652 | 10/1957 | Caslow | 137/106 |
| 2,959,190 | 11/1960 | Barnes et al. | 91/445 |
| 3,160,174 | 12/1964 | Schmiel et al. | 137/625.63 |
| 3,410,306 | 11/1968 | Malott | 91/447 |
| 3,566,749 | 3/1971 | Allen | 91/447 |

Primary Examiner—William R. Cline
Assistant Examiner—George L. Walton
Attorney, Agent, or Firm—Christensen, O'Connor, Garrison & Havelka

[57] ABSTRACT

A hydraulic control system including a housing having a primary four-way control valve and a secondary pressure operated valve therein with fluid passages connecting the two. The housing is connected to a fluid pressure source, a fluid retain, and a hydraulically operated cylinder or motor. The secondary valve, having an interchangeable spool is so designed thru selective modification in the spool to provide the system with special function valves including (1) an over-pressure relief valve for one or both of the cylinder ports, (2) a counterbalance valve for one or both of the cylinder ports, and (3) blocking valves for one or both of the cylinder ports. The special function valves are provided in several combinations by varying the arrangement and construction of the secondary valve spool.

7 Claims, 13 Drawing Figures

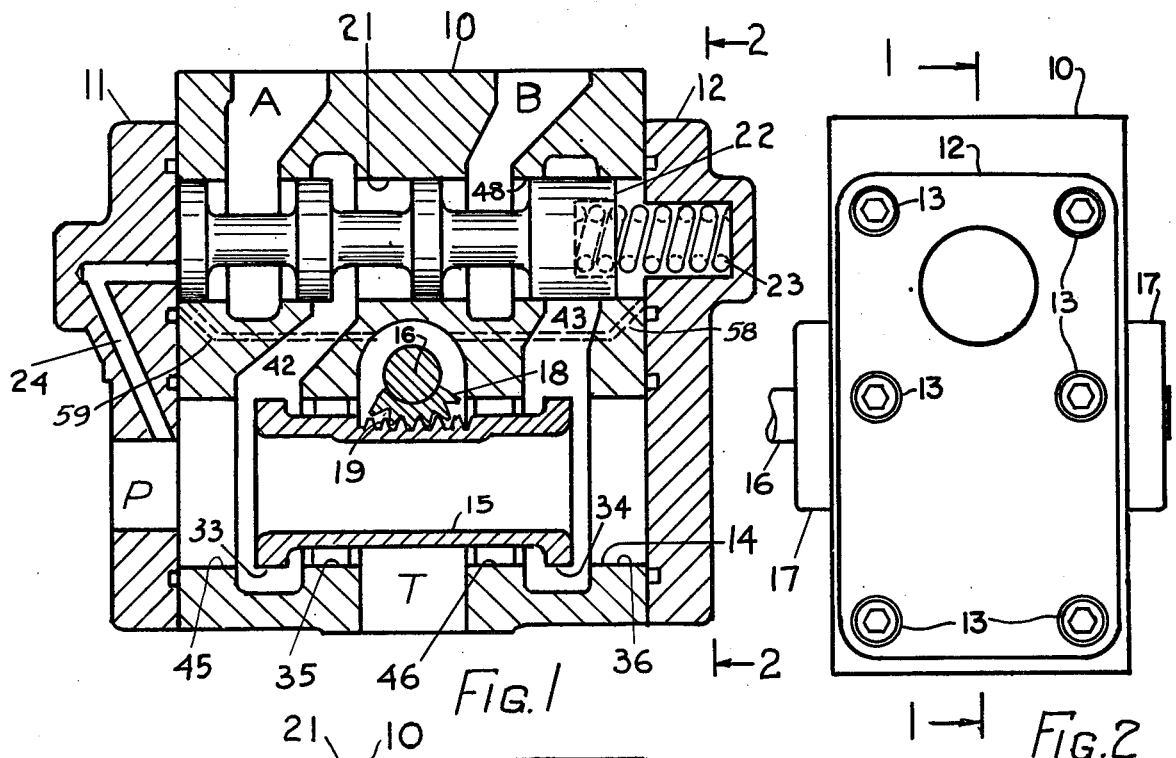
Fig.1
Fig.2
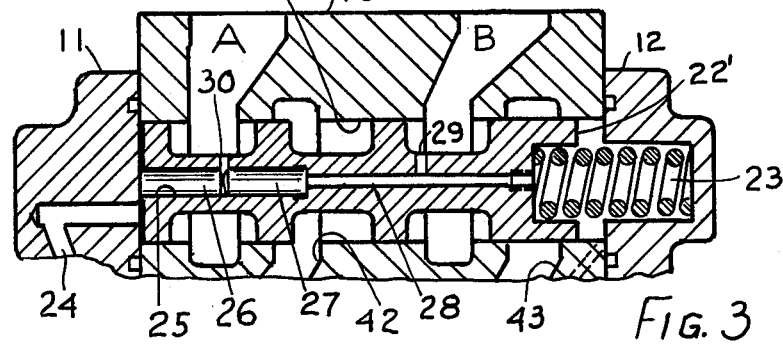
Fig.3
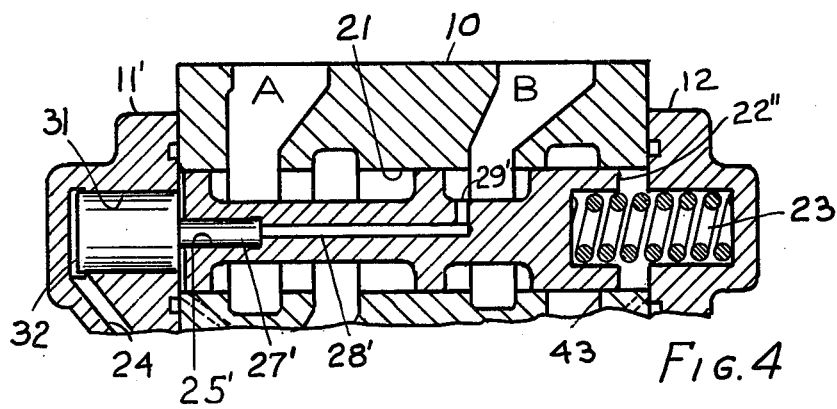
Fig.4

HYDRAULIC CONTROL SYSTEM

BACKGROUND OF THE INVENTION

This invention relates to control valves for hydraulic systems and more particularly to the kind in which various auxiliary and special function valves are included and employed.

A hydraulic system generally includes numerous special function valves in addition to the primary control valve which operates the loading device, motor or cylinder. Such special function valves may include, for example, relief valves for protection against pressure overloads, counterbalance valves which act to control the load while descending and which can provide a constant rate of lowering, and various other valves as may be necessary for a particular system. Such special fucntion valves are usually obtained as separate ocmponents and are assembled into the system with fluid lines. A hydraulic system often becomes complicated when auxiliary valve components are employed due to the number of parts and the intricate piping required. Moreover, as the system requires more parts, it becomes a problem to properly arrange the components, and the system becomes very costly.

The principle object of this invention is to provide in a hydraulic control system and integrally in a valve housing one or more special function valves, including one or more relief valves, blocking valves separate from the primary control spool, and one or more counterbalance valves.

Another object of the invention is to provide in a hydraulic control valve a secondary spool which provides for one or more special function valves and where the secondary spool may be interchanged with another or a different configuration to provide the control valve with other special function valves.

Another object of the invention is to provide a secondary spool which blocks the cylinder ports when the valve is in the "off" or neutral position.

Another object is to provide integral relief valves for protection against inertia-peak hydraulic shock loads when stopping a load.

Another object of the invention is to provide a combination valve package which eliminates complicated extra piping and plumbing and which is therefore simpler, less costly, and easier to manufacture than prior art systems.

BRIEF EDSCRIPTION OF THE DRAWINGS

The foregoing objects and other objects of the invention will be apparent from the following description in connection with the drawings in which:

FIG. 1 is a longitudinal section of a four-way hydraulic control valve,

FIG. 2 is an end view on line 2—2 of FIG. 1,

Figure 5:
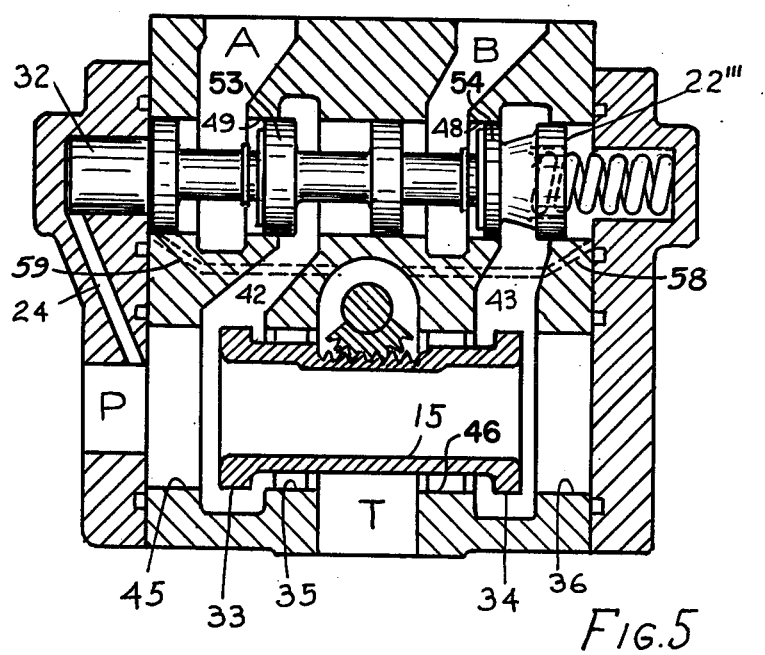
Figure 6:
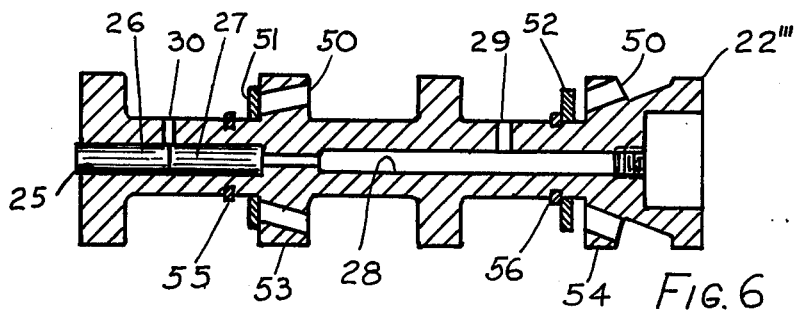
Figure 7:
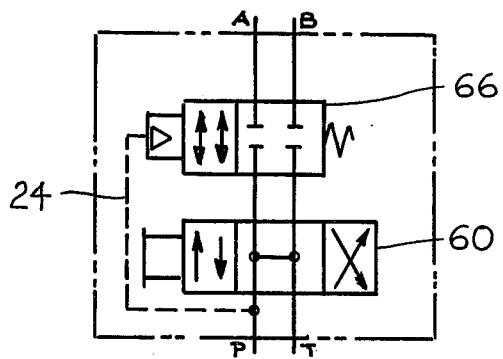

FIG. 3 is a partial longitudinal section of a four-way control valve having two integral relief valves, FIG. 4 is a partial longitudinal section of a four-way control valve having an integral relief valve and a built-in counterbalance valve, FIG. 5 is a longitudinal section of a four-way control valve having two counterbalance valves, one for each direction of flow and two integral relief valves, FIG. 6 is a longitudinal section of the secondary spool of FIG. 5, FIGS. 7 thru 13 are standard graphical hydraulic diagrams of the valve combinations possible in the present invention;

FIG. 7 shows a four-way directional control valve with ports A and B blocked, and ports P and T connected in neutral position.

Figure 8:
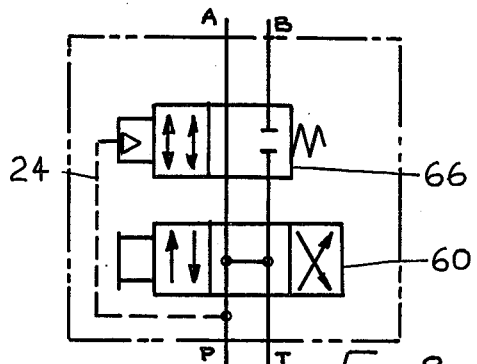

FIG. 8 shows the valve with port B blocked, and ports A, P and T connected in neutral position.

Figure 9:
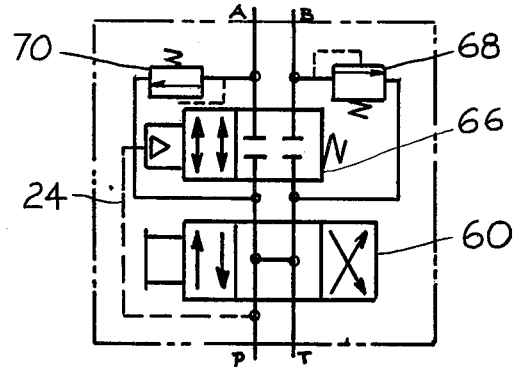

FIG. 9 shows ports A and B blocked in neutral position and ports P and T connected. Here the connections to the cylinder are provided with integral relief valves which open in response to an over-pressure in the cylinder lines.

Figure 10:
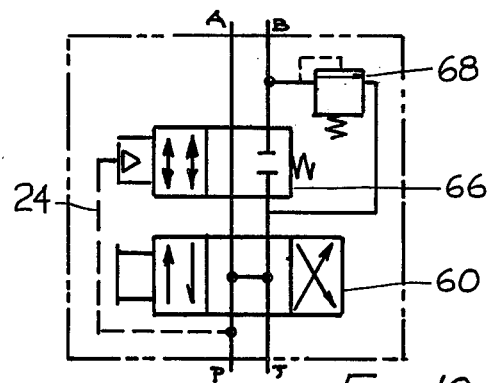

FIG. 10 shows the valve combination of FIG. 8 with one integral relief valve added.

Figure 11:
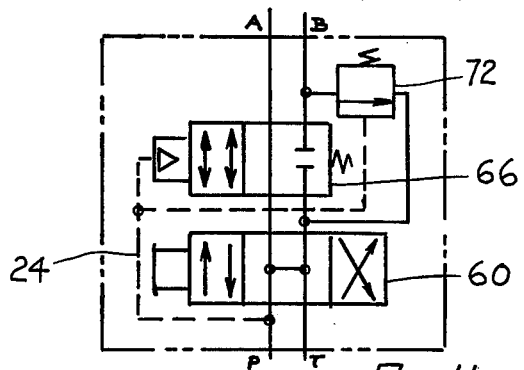

FIG. 11 shows the valve combination of FIG. 8 with a counterbalance valve added.

Figure 12:
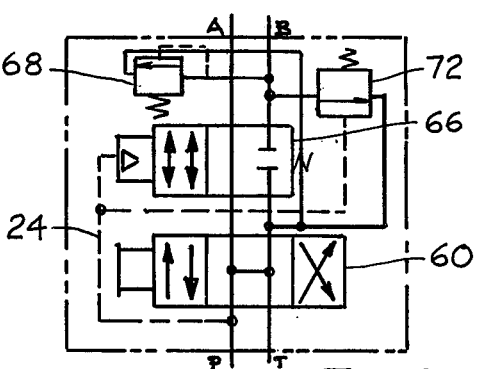
Figure 13:
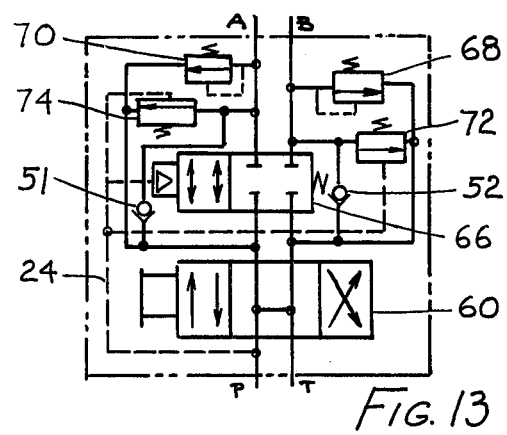

FIG. 12 shows the valve combination with one integral relief valve and one counterbalance valve, and FIG. 13 shows the valve combination with two relief valves and two counterbalance valves.

DESCRIPTION OF PREFERRED EMBODIMENTS

Referring to the drawings, valve body 10 and the valve housing includes inlet plate 11 and end plate 12, both of which are bolted to valve body 10 by capscrews 13. Valve body 10 is provided with bore 14 containing sliding control spool 15. Control shaft 16 extends thru valve body 10 and is supported on each side of the body in bearing plates 17. Control shaft 16 has connected thereto a gear sector 18 which engages gear rack 19 of control spool 15. Valve body 10 is further provided with bore 21 which contains secondary spool 22. Spring 23 is located between end plate 12 and spool 22 urging spool 22 toward inlet plate 11.

Inlet plate 11 is provided with inlet port P (pressure supply), and contains passage 24 which provided connection from inlet port P to the left end of bore 21. Valve body 10 is provided with low pressure port T (tank) which is connected to the low pressure return of the system, and cylinder ports A and B which are connected to the hydraulic machine being operated.

Referring to FIG. 3, spool 22' is provided with bore 25 having plungers 26 and 27 slideably mounted therein. Passage 30 in spool 22' provides fluid connection form bore 25 at a point between plunger 26 and 27 to cylinder port A. Passages 28 and 29 provide fluid connection from the right side of bore 25 to cylinder port B. Valve body 10 is also provided with passages 58 and 59 connected to bore 14 to accommodate the displacement of fluid in the ends of bore 21.

Referring to FIG. 4, spool 22'' is shown having three lands and is provided with bore 25' having plunger 27' slideably mounted therein. Holes 28' and 29' in spool 22' provide fluid passage from bore 25' to cylinder port B. Inlet plate 11' is provided with bore 31 having piston 32 slideably mounted therein.

In the valve combination shown in FIGS. 5 and 6, spool 22''' is provided with four lands, two of which contain holes 50. Spool 22''' is also provided with sliding valve plates 51 and 52 which when forced against lands 53 and 54, respectively, by the flow of fluid from ports A or B, block holes 50. When the flow is directed into ports A or B, the valve plates 51 and 52 separate from their respective lands and allow the fluid to pass through holes 50. The axial motion of valve plates 51 and 52 is limited by retainer rings 55 and 56 respectively located in grooves on the smaller diameter portion of spool 22'''. These rings insure that the valve plates are always within the active flow path.

In operation, referring to FIG. 1, control spool 15 is shown in neutral position allowing fluid entering the valve housing at inlet port P to flow through and around control spool 15 to outlet port T. When control spool 15 is in a neutral position, cylinder ports A and B are blocked off from ports P and T by the lands of spool 22.

When control spool 15 is moved to the right rotation of control handle 16 and the engagement of gear 18 with gear rack 19, lands 33 and 34 of control spool 15 engage simutlaneously with lands 35 and 36, respectively, oif valve body 10, causing inlet fluid to be directed to passage 42. The engagement of these lands creates a pressure increase in the inlet fluid, such pressure being transmitted to the left end of bore 21 through passage 24, forcing spool 22 to move to the right, compressing spring 23 and opening passage 42 to cylinder port A. The movement g spool 22 to the right also opens cylinder port B to passage 43 and outlet port T. The fluid circuit through the valve is thus completed.

When control spool 15 is moved to the left by rotation of control handle 16, lands 33 and 34 of spool 15 engage with lands 45 and 46, respectively, of bore 14, causing the inlet fluid to be directed to passage 43. The subsequent pressure incresae in the inlet fluid is transmitted to bore 21 through passage 24, forcing spool 22 to the right, compressing spring 23, and opening cylinder port A to passage 42 and low pressure port T and opening cylinder port B to passage 43 and inlet port P. The fluid circuit through the valve is thus completed in the opposite direction.

FIG. 1 illustrates a plain version of the control valve combination in which spool 22 has four lands. These lands isolate cylinder ports A and B from the remaining portion of the valve when the control spool is in neutral position. Thus, spool 22 acts as a blocking valve for the cylinder ports. In conventional control valves, the cylinder ports are normally blocked by the primary control spool.

FIG. 3 illustrates a version of the control valve combination which provides relief from over-pressure in ports A or B when the control spool is in neutral position. Over-pressure in the cylinder ports may occur, for example, due to the hydraulic flow through the system being suddenly stopped by the control valve being placed in neutral position. In such case the loading device tends to continue moving due to its inertia and creates a pressure buildup in the fluid of one cylinder port In operation when fluid in port B, for example, receives a pressure shock load, this pressure is transmitted into the end of bore 25 of spool 22' through channels 28 and 29 and acts on plunger 27 and spool 22', causing spool 22' to move to the right, compressing spring 23, and opening cylinder port B to passage 43 and low pressure port I, thus relieving the over-pressure in port B. The port remains open until the pressure surge in port B is relieved. THe moment the pressure in cylinder port B is reduced, spool 22' returns to its closed position due to the force exerted by spring 23. Similarly, when an over-pressure exists in port A, such pressure causes fluid to enter into bore 25 of spool 22' through passage 30 at a point between plungers 26 and 27. This pressure will coact on plungers 26 and 27 and cause plunger 27 and spool 22 to move to the right against spring 23 enough to open port A to passage 42 and low pressure port T. The relief pressure is determined by the size of plungers 26 and 27 and the stiffness of spring 23. By adjusting the size of the plungers and spring different relief pressures can be obtained.

FIG. 4 illustrates a four-way control valve having an integral relief valve and a couterbalance valve. A conventional counterbalance valve is made as a separate unit. Its purpose is to maintain fluid pressure in part of the circuit to counterbalance a load by controlling the rate of fluid returning from the hoisting device and to insure against undesired movements of the load during lowering. Such valves are placed in the hoisting part of the circuit to permit free flow through a chack valve during hoisting and to provide restricted flow during lowering. The restriction is controlled by a pilot operated piston which receives its pressure signal from the pump pressure.

In the present invention a counterbalance valve is built into the four-way control valve. Referring to FIG. 4, port A is the low pressure cylinder port and port B is the high pressure port to which fluid is directed when hoisting.

When hoisting, spool 15 (not shown in this figure, but the same as in FIG. 1) is moved to the left engaging the respective lands 45 and 46 of bore 14. The inlet pressure increases and is transmitted through passage 24 to the left end of piston 32. Piston 32 forces spool 22'' to the right and opens connection from inlet port to high pressure hoisting port B, and from port A to port T.

During lowering spool 15 is moved to the right to direct fluid from port P to passage 42 and passage 24 which causes piston 32 and spool 22'' to move to the right creating a connection from port P to port A and from port B to port T. During lowering it is required that the movement of the load be controlled. This requires regulation of the flow from cylinder port B to low pressure port T. In the present invention this is accomplished as follows: spool 22'' moves to the right against spring 23 as the result of an increase of the inlet fluid pressure caused by the displacement of control spool 15. Land 54 of spool 22'' uncovers land 48 of bore 21 and forms an opening from port B to passage 43 allowing fluid to escape from port B. The amount of opening, determined by the displacement of spool 22''', is a function of the pressure increase at the inlet port. The pressure increase in turn is determined by the displacement of control spool 15. Thus by controlling the movement of control spool 15, the rate of flow from port B to passage 43 and port T, and the lowering rate of the load is regulated.

During lowering it is essential that the low pressure side of the loading device, i.e. cylinder port A, is supplied with sufficient fluid to prevent cavitation, runaway of the motor (or cylinder) and instantaneous dropping of the load. This is accomplished by always having port A in communication with the inlet supply fluid at port P.

FIG. 5 illustrates a control valve combination with two integral relief valves and two counterbalance valves, one for operation in each direction of flow. During hoisting in either flow direction the valve operates as explained above.

During lowering with port B as the high pressure port control spool 15, when moved to the right to direct fluid from port P to passage 42 and passage 24 which causes piston 32 and spool 22''' to move to the right, creates a fluid passage from port P to port A and from port B to port T. The amount of fluid escaping from port B is controlled by the opening caused by land 54 of spool 22''' separating from land 48. The extent of this opening is determined by the displacement of spool 22''' and the pressure at inlet port P in turn regulated by the position of control spool 15. The flow of fluid from port B to passage 43 forces valve plate 52 into abutting engagement with the lefthand face of land 54 of spool 22''', thus blocking holes 50 in land 54 and preventing flow through the same. Consequently, any fluid escaping from port B must pass between lands 48 and 54.

At the same time fluid is also directed from port P to passage 42 through holes 50 in land 53 of spool 22''', and to port A connected to the low pressure side of the hoisting motor. Valve plate 51 is forced away from land 53 by the flow from passage 42 and port P and rests against retainer ring 55. Holes 50 in land 53 are of sufficient size and of sufficient numbers to provide the flow necessary to prevent cavitation at the low pressure side of the motor.

During lowering in the opposite flow direction with port A as the high pressure hoisting port, the rate of lowering is controlled by the amount of oil permitted to escape from port A to passage 42 through the opening between lands 49 and 53 of valve body 10 and spool 22''', respectively. As valve plate 51 is forced against land 53 by the flow, all fluid coming form port A must pass through the opening between lands 49 and 53. Port B is simultaneously supplied with fluid from port P through passage 43 and holes 50 and the check valve arrangement formed in land 54.

In the valve combinations shown the valve body 10 is of the same configuration having the same ports and passages. The only difference in the various valves lies in the construction and arrangement of the secondary spool which in any valve may be interchanged with another spool q a different configuration to provide the control valve with more, less, or other special function valves as shown in FIGS. 7 through 13.

FIGS. 7 through 13 are hydraulic diagrams using standard hydraulic symbols and show some of the valve combinations possible by using the present invention. Referring to FIGS. 7 through 13, the directional control valve portion of the invention, i.e. bore 14 and its intersecting passages, control spool 15 and fluid inlet port P and outlet port T are represented by valve 60. Valve 66 represents the secondary valve including bore 21, spool 22 ports A and B and spring 23. Channel 24 in end plate 11 is shown connecting inlet port P with the secondary valve opposite spring 23.

The diagram of FIG. 7 corresponds to the structure FIG. 1 in which ports A and B are blocked by spool 22 in the neutral position. In this valve combination spool 22 contains 4 lands. FIG. 8 shows the valve combination with port B blocked and ports A, P, and T connected in the neutral position.

FIG. 9 shows the valve comination with ports A and B blocked in the neutral position and includes two integral relief valves 68 and 70. This valve combination corresponds to the structure FIG. 3. FIG. 10 shows the valve combination with port B blocked in the neutral position and one relief valve 68 for port B.

FIG. 11 illustrates the valve combination with port B blocked in the neutral position and includes a counterbalance valve 72. FIG. 12 shows the valve combination of FIG. 11 with one relief valve 68 connected to port B. This valve combination corresponds to the structure of FIG. 4.

FIG. 13 corresponds to the valve combination of FIGS. 5 and 6 having two counterbalance valves 72 and 74, and two relief valves 68 and 70 which provide relief for overpressure in ports B and A respectively. Counterbalance valves 72 and 74 includes check valves 52 and 51, respectively, (also shown in FIG. 6 as valve plates 52 and 51) which permits flow into, but not out from, the cylinder ports.

FIGS. 7 through 13 are standard hydraulic diagrams which show only the function of the various valve combinations and not the construction of the mechanism. The envelope (dashed lines) surrounding each diagram indicates that all components within the envelope are ingegral with the mechanism.

Having described the invention and its operation, it is clear that the objects stated have been attained in a practical manner. While certain specific embodiments of the invention have been shown and described, it is understood that changes may be made in the construction and arrangement of the various parts without departing from the spirit of the invention as expressed in the following claims.

What is claimed is;

1. An improvement in a fluid control system comprising:

a housing having a first bore, a control spool slidable in said first bore, said control spool having lands and intermediate grooves, said housing having a plurality of first passages intersecting said first bore for selective cooperation with said lands and grooves of said control spool, said control spool being movable between hoisting, neutral and lowering positions, said housing having inlet and outlet fluid ports, said control spool so constructed and arranged as to alternately connect two of said first passages to respective ones of said inlet and outlet ports upon movement of said control spool to hoisting and lowering positions said housing having a second bore, a second spool slidable in said second bore, said second spool having lands and intermediate grooves, said housing having a plurality of second passages intersecting said second bore for selective cooperation with said lands and grooves on said second spool, said housing having a first cylinder port connected to one of said second passages and a second cylinder port connected to another of said second passages, two of said first passages being respectively connected to two of said second passages, a spring normally maintaining said second spool toward one end of said second bore whereby lands of said second spool block the fluid flow in said second passages thereby blocking flow from said cylinder ports, pressure responsive means adapted to provide movement of said second spool against said spring whereby said second passages are opened so that fluid can flow into and out from respective cylinder ports, said pressure responsive means comprising a fluid passage from said inlet port to an end of said second bore to transmit fluid pressure thereto upon movement of said control spool to hoisting and lowering positions, and valve means in at least one of said lands on said second spool for allowing flow from one of said first passages to one of said second passages and for blocking flow from said one of said second passages to said one of said first passages when said spring is normally maintaining said second spool toward said one end of said second bore.

2. The system of claim 1 wherein said valve means comprises:

a plurality of substantially axial passages through one of said lands on said second spool, a first valve plate member slidably mounted in one of said grooves of said second spool and positioned on the cylinder port side of said one of said lands, said valve plate member adapted to slide in said one of said grooves toward said land and block said plurality of passages through said one of said lands in response to fluid flow from said cylinder port, said valve plate member further adapted to slide away from said land to open said plurality of passages in response to fluid flow through said second passages into said cylinder port.

3. The system of claim 2 further comprising:

a plurality of substantially axial passages through a second of said lands on said second spool, a second valve plate member slidably mounted on a second of said grooves of said second spool and positioned on the cylinder port side of said second of said lands, said valve plate member adapted to slide on said second of said grooves toward said land and block said plurality of passages through said second of said lands in response to fluid flow from said cylinder port, said valve plate member further adapted to slide away from said second of said lands to open said plurality of said passages in response to fluid flow through said second passages into said cylinder port.

4. An improvement in a fluid control system comprising:

a housing having a first bore, a control spool slidable in said first bore, said control spool having lands and intermediate grooves, said housing having a plurality of first passages intersecting said first bore for selective cooperation with said lands and grooves of said control spool, said control spool being movable between hoisting, neutral, and lowering positions, said housing having inlet and outlet fluid ports, said control spool so constructed and arranged as to alternately connect two of said first passages to respective ones of said inlet and outlet ports upon movement of said control spool to hoisting and lowering positions, said housing having a second bore, a second spool slidable in said second bore, said second spool having lands and intermediate grooves, said housing having a plurality of second passages intersecting said second bore for selective cooperation with said lands and grooves on said second spool, said housing having a first cylinder port connected to one of said second passages and a second cylinder port connected to another of said second passages, two of said first passages being respectively connected to two of said second passages, a spring normally naintaining said second spool toward one end of said second bore whereby lands of said second spool block the fluid flow in said second passages thereby blocking flow from said cylinder ports, pressure responsive means adapted to provide movement of said second spool against said spring whereby said second passages are opened so that fluid can flow into and out from respective cylinder ports, said pressure responsive means comprising a fluid passage from said inlet port to an end of said second bore to transmit fluid pressure thereto upon movement of said control spool to hoisting and lowering positions, and means on said housing including a removable member for gaining access to said second bore from the outside of said housing to remove and interchange said second spool, said second spool further having at least two of a. first means responsive to fluid overpressure in said first cylinder port for moving said second spool away from said one end of said second bore against said spring to relieve said fluid overpressure in said first cylinder port, b. second means responsive to fluid overpressure in said second cylinder port for moving said second spool away from said one end of said second bore against said spring to relieve said fluid overpressure in said second cylinder port, and c. valve means in at least one of said lands on said second spool for allowing flow through one of said second passages into one of said cylinder ports from one of said first passages and for stopping flow from said one of said cylinder ports to said one of said first passages when said second spool is being normally maintained toward said one end of said second bore by said spring.

5. An improvement in a fluid control system comprising:

a housing having a first bore, a control spool slidable in said first bore said control spool having lands and intermediate grooves, said housing having a plurality of first passages intersecting said first bore for selective cooperation with said lands and grooves of said control spool, said central spool being movable between hoisting, neutral, and lowering positions, said housing having said housing and outlet fluid ports, said control spool so constructed and arranged as to alternately connect two of said first passages to respective ones of said inlet and outlet ports upon movement of said control spool to hoisting and lowering positions said housing having a second bore, a second spool slidable in said second bore, said second spool having lands and intermediate grooves, said housing having a plurality of second passages intersecting said second bore for selective cooperation with said lands and grooves on said second spool, said housing having a first cylinder port connected to one of said second passages and a second cylinder port connected to another of said second passages, two of said first passages being respectively connected to two of said second passages, a spring normally maintaining said second spool in a first position adjacent to one end of said second bore whereby lands of said second spool block the fluid flow in said second passages thereby blocking flow from said cylinder ports, pressure responsive means for moving said second spool against said sprinig and away from said one end of said second bore to a second position wherein said second passages are open so that fluid can flow into and out from said respective cylinder ports, said pressure responsive means comprising a fluid passage from said inlet port to said one end of said second bore to transmit fluid pressure to said one end of said second bore upon movement of said control spool to hoisting and lowering positions, said second spool being operable to move only between said first and second positions, said second spool having a longitudinal bore, said longitudinal bore having one end opening toward said one end of said second bore and the other end terminating in said second spool, a first plunger slidably mounted in said longitudinal bore, a first port in said second spool connecting one of said cylinder ports to said longitudinal bore whereby fluid overpressure in said cylinder port is transmitted to said longitudinal bore to exert force on one end of said plunger and said second spool, thereby causing said second spool to move axially against said spring to momentarily open passage from said cylinder port to one of said first and second connected passages to relieve overpressure in said cylinder port, and a second plunger slidably mounted in the same longitudinal bore, a second port in said second spool connecting a location in said longitudinal bore between said first and second plungers to the second of said cylinder ports whereby fluid overpressure in said second cylinder port is transmitted to said longitudinal bore to exert a force on said second plunger and said second spool, thereby causing said second spool to move axially against said spring to momentarily open passage from said second cylinder port to the other of said first and second connected passages to relieve overpressure in said second cylinder port.

6. An improvement in a fluid control system comprising:

a housing having a first bore, a control spool slidable in said first bore, said control spool having lands and intermediate grooves, said housing having a plurality of first passages intersecting said first bore for selective cooperation with said lands and grooves of said control spool, said control spool being movable between hoisting, neutral, and lowering positions, said housing having inlet and outlet fluid ports, said control spool so constructed and arranged as to alternately connect two of said first passages to respective ones of said inlet and outlet ports upon movement of said control spool to hoisting and lowering positions, said housing having a second bore, a second spool slidable in said second bore, said second spool having lands and intermediate grooves, said housing having a plurality of second passages intersecting said second bore for selective cooperation with said lands and grooves on said second spool, said housing having a first cylinder port connected to one of said second passages, and a second cylinder port in said housing connected to another of said second passages, two of said first passages being respectively connected to two of said second passages, a spring normally maintaining said second spool in a first position adjacent to one end of said second bore, the lands of said second spool cooperating with said second bore and said second passages when said second spool is in said first position so as to block the fluid floow in one of said second passages to thereby block the fluid flow from one of said cylinder ports and so as to open one of said second passages to fluid flow to thereby place the other of said cylinder ports in open fluid connection with one of said first passages, said housing having a third bore placed substantially coaxially with said second bore, a piston in said third bore, said piston in abutting engagement with said second opposite said spring, pressure responsive means for moving said second spool against said spring and away from said one end of said second bore to a second position wherein said second passages are opened so that fluid can flow into and out from the cylinder ports, said pressure responsive means comprising a fluid passage from said inlet port to an end of said third bore to transmit fluid pressure to said end of said third bore upon movement of said control spool to hoisting and lowering positions thereby causing said piston to move toward said second spool and causing said second spool to move to said second position, said second spool being operable to move only between said first and second positions.

7. In the system of claim 6 the improvement further comprising:

said second spool having a longitudinal bore having one end open toward said one end of said second bore and the other end terminating in said second spool, a plunger slidably mounted in said longitudinal bore, a first port in said second spool connecting the other of said cylinder ports to said longitudinal bore whereby fluid pressure in said one of said cylinder ports is transmitted to said longitudinal bore to exert force on one end of said plunger and said second spool, thereby causing said second spool to move axially against said spring to momentarily open passage from said one of said cylinder ports to one of said first and second connected passages to relieve overpressure in said second cylinder port.

* * * * *

UNITED STATES PATENT OFFICE
CERTIFICATE OF CORRECTION

PATENT NO. : 3,880,181
DATED : April 29, 1975
INVENTOR(S) : Finn Feroy

It is certified that error appears in the above-identified patent and that said Letters Patent are hereby corrected as shown below:

Column 8, line 46 delete "said housing having".
Column 8, line 47 after "housing" add --having inlet--.
Column 9, line 2 "sprinig" should read --spring--.
Column 10, line 16 "floow" should read --flow--.
Column 10, line 26 after "second" insert --spool--.

Signed and sealed this 15th day of July 1975.

(SEAL)
Attest:

RUTH C. MASON
Attesting Officer

C. MARSHALL DANN
Commissioner of Patents
and Trademarks